US008411106B2

(12) United States Patent
Ten et al.

(10) Patent No.: US 8,411,106 B2
(45) Date of Patent: Apr. 2, 2013

(54) CONVERTING DIGITAL VALUES CORRESPONDING TO COLORS OF AN IMAGE FROM A SOURCE COLOR SPACE TO A DESTINATION COLOR SPACE

(75) Inventors: Arkady Ten, Sunnyvale, CA (US); John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1129 days.

(21) Appl. No.: 12/346,732

(22) Filed: Dec. 30, 2008

(65) Prior Publication Data

US 2010/0164980 A1 Jul. 1, 2010

(51) Int. Cl.
*G09G 5/02* (2006.01)
(52) U.S. Cl. ........ 345/604; 345/589; 345/590; 345/591; 345/600; 382/162; 382/167
(58) Field of Classification Search .................. None
See application file for complete search history.

(56) References Cited

U.S. PATENT DOCUMENTS

| 7,068,284 | B2 | 6/2006 | Stokes |
| 7,280,260 | B2 | 10/2007 | Hagai et al. |
| 7,333,237 | B2 | 2/2008 | Ogatsu et al. |
| 7,336,817 | B2 | 2/2008 | Kasperkiewicz et al. |
| 7,339,700 | B2 | 3/2008 | Ohga et al. |
| 8,189,010 | B2 * | 5/2012 | Mebane ......... 345/590 |
| 2005/0185837 | A1 | 8/2005 | Takano et al. |
| 2007/0052987 | A1 * | 3/2007 | Jung ............... 358/1.9 |
| 2007/0153020 | A1 * | 7/2007 | Inoue ............. 345/591 |
| 2007/0296984 | A1 | 12/2007 | Kress |

OTHER PUBLICATIONS

Gentile, R.S., et al., "A Comparison of Techniques for Color Gamut Mismatch Compensation", Journal of Imaging Technology, Oct. 1990, pp. 176-181, vol. 16, No. 5.
Hung-Shing, C., et al., "Adaptive Gamut Mapping Method Based on Image-to-Device", IS & T NIP 15, 1999, pp. 346-349.
"Photography and graphic technology—Extended colour encodings for digital image storage, manipulation and interchange", International Standard, ISO 22028/-1:2004(E), First Edition, Mar. 15, 2004.

* cited by examiner

*Primary Examiner* — Antonio A Caschera
(74) *Attorney, Agent, or Firm* — Fitzpatrick, Cella, Harper & Scinto

(57) ABSTRACT

Conversion of colors of an image from a source color space to a destination color space by use of both a color profile and an image profile. The source and destination color spaces are respectively represented by source and destination color space transformations associated with source and destination color profiles. Colors in an image are converted from the source color space to a device-independent color space, using the source color space transformation. A gamut mapping is determined from a source color gamut to a destination color gamut, by using a gamut boundary description constructed either from a source image profile which is separate from the source color profile, or from a destination image profile which is separate from the destination color profile. The gamut mapping is applied, and the gamut mapped colors are transformed from the device-independent color space to the destination color space, using the destination color space transformation.

20 Claims, 9 Drawing Sheets

CONVERTING DIGITAL VALUES CORRESPONDING TO COLORS OF AN IMAGE FROM A SOURCE COLOR SPACE TO A DESTINATION COLOR SPACE

FIELD

The invention relates to the field of converting image data, and more particularly relates to converting digital values corresponding to colors of an image from a source color space to a destination color space.

BACKGROUND

Color management systems (e.g., ICC/WCS-type systems) rely on device-to-device gamut mapping. This typically requires two gamuts, being the input device gamut and the output device gamut, to transform source colors to destination colors. This is due to the fact that all possible colors of a source color space may occupy a different volume if compared to all possible colors of a destination device. This is referred to as gamut mismatch.

Gamut mapping algorithms often use compression to address gamut mismatch, where in-gamut colors are compressed into a smaller gamut and where out-of-gamut colors are placed in between the smaller gamut and the destination device gamut boundary. As a result, device-to-device gamut mapping may introduce unnecessary color compression and consequently loss of saturation on gamut mapped images.

Furthermore, such device-to-device gamut mapping typically assumes that images have a color range which is smaller than the color range of the encoding color space. In other words, every device color space covers a certain range of colors. However, colors presented on an image do not necessarily span the entire color range available for a device. This is seen to correspond with underutilization of the encoding color space, and typically results in suboptimal color reproduction.

Underutilization of a color space may also be realized when an image is re-encoded, where an image originally encoded in one color space is re-encoded into another color space which is larger than the original color space. When re-encoding the image into the larger color space, the gamut of the original image, which is determined from the encoding profile, is lost and the gamut of the encoding space is all that is available. Consequently, subsequent gamut mapping will typically produce suboptimal color reproduction.

Thus, there is a need for systems and methods for improved gamut mapping when converting image data from a source device to a destination device.

SUMMARY

Disclosed embodiments describe systems and methods for converting digital values corresponding to colors of an image from a source color space to a destination color space, the source color space being represented by a source color space transformation associated with a source color profile, and the destination color space being represented by a destination color space transformation associated with a destination color profile. Certain disclosed embodiments provide for converting digital values corresponding to colors contained in the image from the source color space to digital values in a device-independent color space, using the source color space transformation, and determining a gamut mapping from a source color gamut to a destination color gamut, by using a source gamut boundary description constructed from a source image profile which is separate from the source color profile, or by using a destination gamut boundary description constructed from a destination image profile which is separate from the destination color profile. The digital values in the device-independent color space are converted to corresponding digital values in the device-independent color space using the gamut mapping, wherein the converted digital values represent gamut mapped digital values between the source gamut boundary description and the destination gamut boundary description. The gamut mapped digital values in the device-independent color space are transformed to corresponding digital values in the destination color space, using the destination color space transformation.

Thus, in an example embodiment described herein, a method for converting digital values corresponding to colors of an image from a source color space to a destination color space, the source color space being represented by a source color space transformation associated with a source color profile, and the destination color space being represented by a destination color space transformation associated with a destination color profile, is provided. The method includes converting digital values corresponding to colors contained in the image from the source color space to digital values in a device-independent color space, using the source color space transformation, and determining a gamut mapping from a source color gamut to a destination color gamut, by using a source gamut boundary description constructed from a source image profile which is separate from the source color profile, or by using a destination gamut boundary description constructed from a destination image profile which is separate from the destination color profile. The method further includes converting the digital values in the device-independent color space to corresponding digital values in the device-independent color space using the gamut mapping, wherein the converted digital values represent gamut mapped digital values between the source gamut boundary description and the destination gamut boundary description. In addition, the method includes transforming the gamut mapped digital values in the device-independent color space to corresponding digital values in the destination color space, using the destination color space transformation.

In a further example embodiment, a color management module which converts digital values corresponding to colors of an image from a source color space to a destination color space, the source color space being represented by a source color space transformation associated with a source color profile, and the destination color space being represented by a destination color space transformation associated with a destination color profile is provided. The color management module includes a first conversion module constructed to convert digital values corresponding to colors contained in the image from the source color space to digital values in a device-independent color space, using the source color space transformation, and a determination module constructed to determine a gamut mapping from a source color gamut to a destination color gamut, by using a source gamut boundary description constructed from a source image profile which is separate from the source color profile, or by using a destination gamut boundary description constructed from a destination image profile which is separate from the destination color profile. The color management module further includes a second conversion module constructed to convert the digital values in the device-independent color space to corresponding digital values in the device-independent color space using the gamut mapping, wherein the converted digital values represent gamut mapped digital values between the source gamut boundary description and the destination gamut boundary description. In addition, the color management module includes a transformation module constructed to transform the gamut mapped digital values in the device-independent color space to corresponding digital values in the destination color space, using the destination color space transformation.

In yet a further example embodiment, a color management apparatus including a computer-readable memory constructed to store computer-executable process steps, and a processor constructed to execute the computer-executable process steps stored in the memory is provided. The process steps stored in the memory cause the processor to convert digital values corresponding to colors of an image from a source color space to a destination color space, the source color space being represented by a source color space transformation associated with a source color profile, and the destination color space being represented by a destination color space transformation associated with a destination color profile. The process steps include converting digital values corresponding to colors contained in the image from the source color space to digital values in a device-independent color space, using the source color space transformation, and determining a gamut mapping from a source color gamut to a destination color gamut, by using a source gamut boundary description constructed from a source image profile which is separate from the source color profile, or by using a destination gamut boundary description constructed from a destination image profile which is separate from the destination color profile. The process steps further include converting the digital values in the device-independent color space to corresponding digital values in the device-independent color space using the gamut mapping, wherein the converted digital values represent gamut mapped digital values between the source gamut boundary description and the destination gamut boundary description, and transforming the gamut mapped digital values in the device-independent color space to corresponding digital values in the destination color space, using the destination color space transformation.

In yet a further example embodiment, a computer-readable memory medium on which is stored computer-executable process steps for causing a computer to convert digital values corresponding to colors of an image from a source color space to a destination color space, the source color space being represented by a source color space transformation associated with a source color profile, and the destination color space being represented by a destination color space transformation associated with a destination color profile is provided. The process steps include converting digital values corresponding to colors contained in the image from the source color space to digital values in a device-independent color space, using the source color space transformation, and determining a gamut mapping from a source color gamut to a destination color gamut, by using a source gamut boundary description constructed from a source image profile which is separate from the source color profile, or by using a destination gamut boundary description constructed from a destination image profile which is separate from the destination color profile. The process steps further include converting the digital values in the device-independent color space to corresponding digital values in the device-independent color space using the gamut mapping, wherein the converted digital values represent gamut mapped digital values between the source gamut boundary description and the destination gamut boundary description, and transforming the gamut mapped digital values in the device-independent color space to corresponding digital values in the destination color space, using the destination color space transformation.

At least one of the source color profile, destination color profile, source image profile and destination image profile can be a device profile. The source image profile can provide information for a gamut boundary description which describes a gamut boundary for the image. The source image profile can provide information for a gamut boundary description which describes a gamut boundary for a source device from which the image was captured. The destination image profile can provide information for a gamut boundary description which describes a gamut boundary for a destination device to which the image will be rendered.

At least one of the source color profile and the destination color profile can be an International Color Consortium (ICC) profile or a Windows Color System (WCS) profile. At least one of the source image profile and the destination image profile can be an ICC profile or a WCS profile. At least one of the source image profile and the destination image profile can be embedded within its corresponding source color profile or destination color profile.

At least one of the source image profile and the destination image profile can be stored under a tag in a data form which can be compressed for storage efficiency. At least one of the source image profile and the destination image profile can be stored under the tag in binary form, in a case where the corresponding source color profile or destination color profile is an ICC profile. At least one of the source image profile and the destination image profile can be stored under the tag in XML, in a case where the corresponding source color profile or destination color profile is a WCS profile.

This brief summary has been provided so that the nature of this disclosure may be understood quickly. A more complete understanding can be obtained by reference to the following detailed description and to the attached drawings.

DETAILED DESCRIPTION

Figure 1:
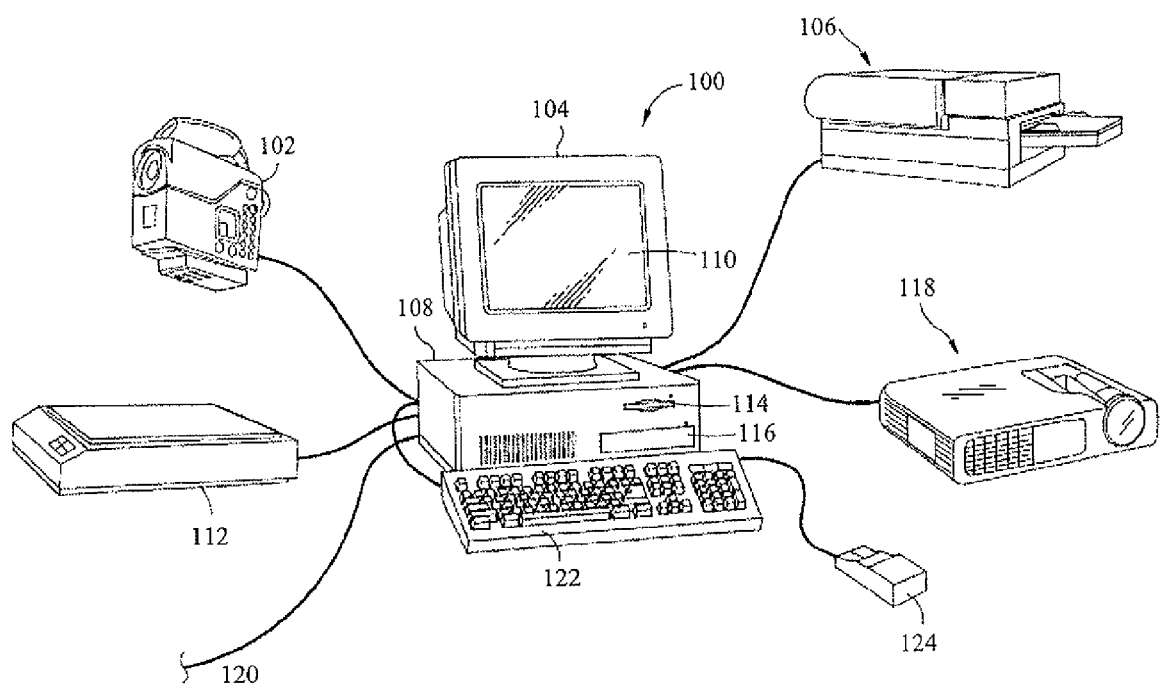
FIG. 1 is a representative view of computing equipment relevant to one example embodiment.

FIG. 1 is a representative view of computing equipment, peripherals and digital devices, relevant to one example embodiment. Computing equipment 100 includes host computer 108 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 100 includes color monitor 104 including display screen 110, keyboard 122 for entering text data and user commands, and pointing device 124. Pointing device 124 preferably comprises a mouse for pointing and for manipulating objects displayed on display screen 110.

Host computer 108 also includes computer-readable memory media such as computer hard disk 116 and DVD disk drive 114, which are constructed to store computer-readable information such as computer-executable process steps. DVD disk drive 114 provides a means whereby host computer 108 can access information, such as image data, computer-executable process steps, application programs, etc. stored on removable memory media. In an alternative, information can also be retrieved through other computer-readable media such as a USB storage device connected to a USB port (not shown), or through network interface 120. Other devices for accessing information stored on removable or remote media may also be provided.

Projector 118 is a first example of a color output device, and in this example is provided for projecting images in accordance with image data from host computer 108 onto a projection screen (not shown). Printer 106 is a second example of a color output device, and in this example is provided for forming color images in accordance with image data from host computer 108 onto a medium such as paper.

Digital color scanner 112 is a first example of a color input device, and is provided for scanning documents and images and sending the corresponding image data to host computer 108. Digital color camera 102 is a second example of a color input device, and is provided for sending digital image data to host computer 108.

Of course, host computer 108 may acquire digital image data from other sources such as a digital video camera, a local area network or the Internet via network interface 120. Likewise, host computer 108 may interface with other color output devices, such as color output devices accessible over network interface 120.

Figure 2:
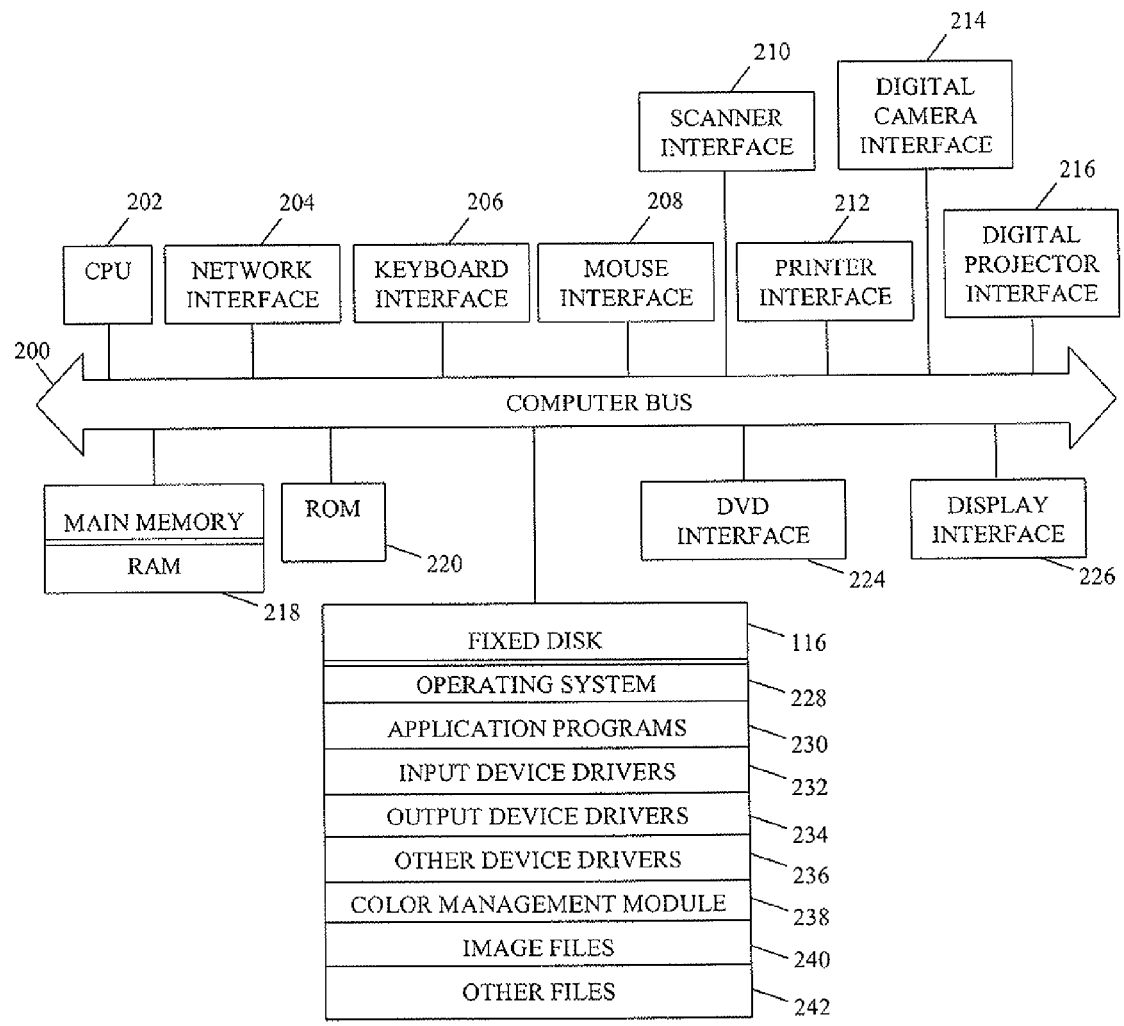
FIG. 2 is a detailed block diagram depicting the internal architecture of the host computer shown in FIG. 1.

FIG. 2 is a detailed block diagram showing the internal architecture of host computer 108 of computing equipment 100. As shown in FIG. 2, host computer 108 includes central processing unit (CPU) 202 which interfaces with computer bus 200. Also interfacing with computer bus 200 are hard disk 116, network interface 204, random access memory (RAM) 218 for use as a main run-time transient memory, read only memory (ROM) 220, DVD disk interface 224, display interface 226 for monitor 104, keyboard interface 206 for keyboard 122, mouse interface 208 for pointing device 124, scanner interface 210 for scanner 112, printer interface 212 for printer 106, digital camera interface 214 for digital camera 102, and digital projector interface 216 for digital projector 118.

RAM 218 interfaces with computer bus 200 so as to provide information stored in RAM 218 to CPU 202 during execution of the instructions in software programs such as an operating system, application programs, color management modules, and device drivers. More specifically, CPU 202 first loads computer-executable process steps from fixed disk 116, or another storage device into a region of RAM 218. CPU 202 can then execute the stored process steps from RAM 218 in order to execute the loaded computer-executable process steps. Data such as color images or other information can be stored in RAM 218, so that the data can be accessed by CPU 202 during the execution of computer-executable software programs, to the extent that such software programs have a need to access and/or modify the data.

As also shown in FIG. 2, hard disk 116 contains operating system 228, application programs 230, such as word processing programs or a graphic image management programs. Hard disk 116 also contains device drivers for software interface to devices, such as input device drivers 232, output device drivers 234, and other device drivers 236. Image files 240, including color image files, and other files 242 are available for output to color output devices and for manipulation by application programs.

Color management module (CMM) 238 manages colors that are transferred from a source device to a destination device, such as the transfer of color image data captured by digital camera 102 to display by projector 118. CMM 238 can comprise computer-executable process steps to convert digital values corresponding to colors of an image from a source color space to a destination color space. The source color space can be represented by a source color space transformation associated with a source color profile, and the destination color space can be represented by a destination color space transformation associated with a destination color profile. More particularly, CMM 238 can: convert digital values corresponding to colors contained in the image from the source color space to digital values in a device-independent color space, using the source color space transformation; determine a gamut mapping from a source color gamut to a destination color gamut, by using a source gamut boundary description constructed from a source image profile which is separate from the source color profile, or by using a destination gamut boundary description constructed from a destination image profile which is separate from the destination color profile; convert the digital values in the device-independent color space to corresponding digital values in the device-independent color space using the gamut mapping, wherein the converted digital values represent gamut mapped digital values between the source gamut boundary description and the destination gamut boundary description; and transform the gamut mapped digital values in the device-independent color space to corresponding digital values in the destination color space, using the destination color space transformation.

CMM 238 may be configured as a part of operating system 228, as part of a device driver (e.g., printer driver, digital camera driver), or as a stand-alone application program such as a color management system. It may also be configured as a plug-in or dynamic link library (DLL) to the operating system, device driver or application program. For example, CMM 238 according to example embodiments may be incorporated in an input/output device driver for execution in a computing device, embedded in the firmware of an input/output device, or provided in a stand-alone color management application for use on a general purpose computer. In one example embodiment described herein, CMM 238 is incorporated directly into the operating system for general purpose host computer 108. It can be appreciated that the present disclosure is not limited to these embodiments and that the disclosed color management module may be used in other environments in which color management is used.

Figure 3:
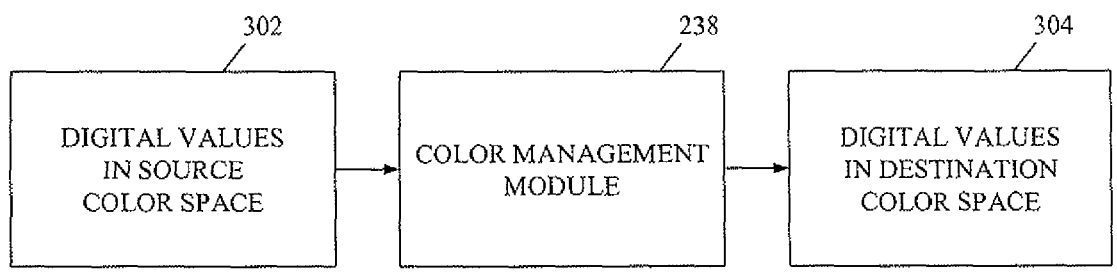
FIG. 3 is a representational view of color transform processing performed by a color management module according to an example embodiment.

FIG. 3 shows a representational view of color transform processing performed by a color management. As mentioned above, the color transform processing can correspond with converting digital values corresponding to colors of an image from a source color space to a destination color space. The source color space can be represented by a source color space transformation associated with a source color profile, and the destination color space can be represented by a destination color space transformation associated with a destination color profile. CMM 238 can be applied to the colors in source color space 302 so as to obtain counterpart colors in destination color space 304.

In use of CMM 238, nearly any device can serve as the source device, and nearly any device can serve as the destination device. In one example, the source device might be digital camera 102 which captures an image of a natural scene, and the destination device might be color laser printer 106 which produces a printout of the captured image. In other examples, the source device might be color laser printer 106 which has produced a printout of a color image, and the destination device might be scanner 112 which scans the printout. In another example, the source device might be display 110 which is displaying a color image, and the destination device might be projector 118 for which it is desired to project a counterpart color image to the image being displayed by display 110. Other combinations and permutations are possible and will be evident to those of ordinary skill in the art.

Figure 4:
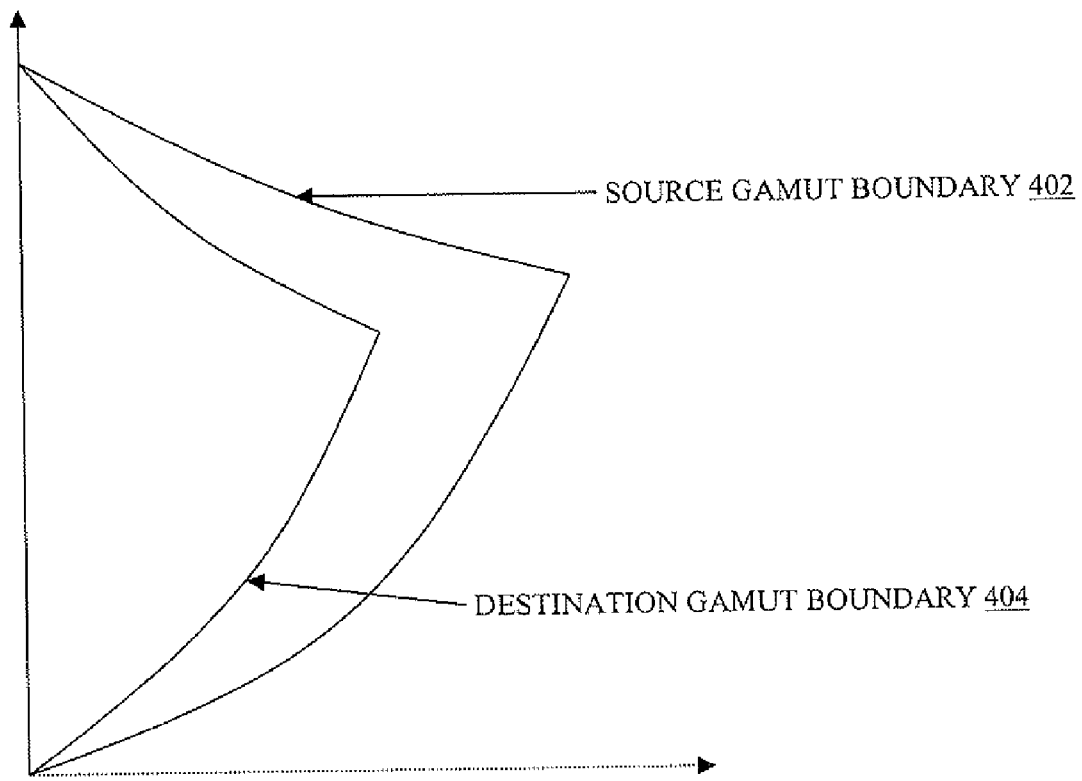
FIG. 4 is a diagram for illustrating an example of gamut mismatch between a source device and a destination device.

FIG. 4 is a diagram for illustrating an example of gamut mismatch between a source device and a destination device. As noted above, all possible colors of a source color space may occupy a different volume if compared to all possible colors of a destination color space. This is referred to as gamut mismatch.

As can be seen in FIG. 4, colors located between source gamut boundary 402 and destination gamut boundary 404 are irreproducible on the destination device. Thus, irreproducible colors should mapped into reproducible colors on the destination device.

Two common gamut mapping strategies are clipping and compression. In clipping, all the out-of-gamut colors are mapped to the destination gamut boundary. Clipping typically does not require knowledge of the source gamut.

Figure 5:
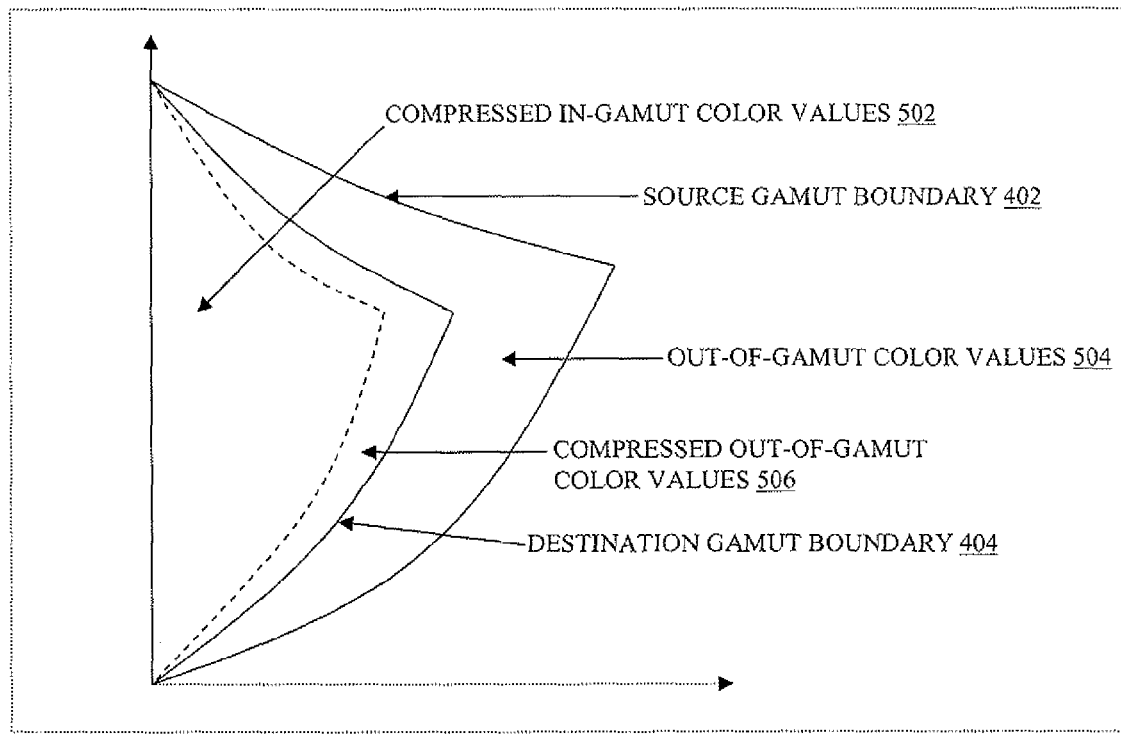
FIG. 5 is a diagram for illustrating an example of using compression to address the gamut mismatch illustrated in FIG. 4.

On the other hand, FIG. 5 is a diagram for illustrating an example of using compression to address the gamut mismatch illustrated in FIG. 4. Compression moves (or compresses) color values into the destination gamut. Compression allows for detail preservation for out-of-gamut colors that might be lost if clipping is used.

As can be seen in FIG. 5, the compression gamut mapping strategy moves out-of-gamut color values 504 to compressed out-of-gamut color values 506, to be inside the destination device color gamut (e.g., within destination gamut boundary 404). In addition, compression moves in-gamut color values (e.g., color values already within destination gamut boundary 404) to compressed in-gamut color values 502, to make space for out-of-gamut colors 504. For example, the dashed line in FIG. 5 shows the border of compressed in-gamut color values 502 after gamut mapping. Thus, in-gamut color values are placed within a smaller gamut (e.g., the dashed line), while the out-of-gamut color values 504 are placed between the smaller gamut (dashed line) and the destination gamut boundary 404.

As such, although a variety of device-to-device perceptual gamut mapping algorithms are available, many of them compress in-gamut colors into a smaller gamut and place out-of-gamut colors between the smaller gamut and the destination device gamut boundary. As a result, such device-to-device gamut mapping may introduce unnecessary color compression and consequently loss of saturation on gamut-mapped images. Such unnecessary color compression will be described in greater detail with reference to FIG. 6.

Figure 6:
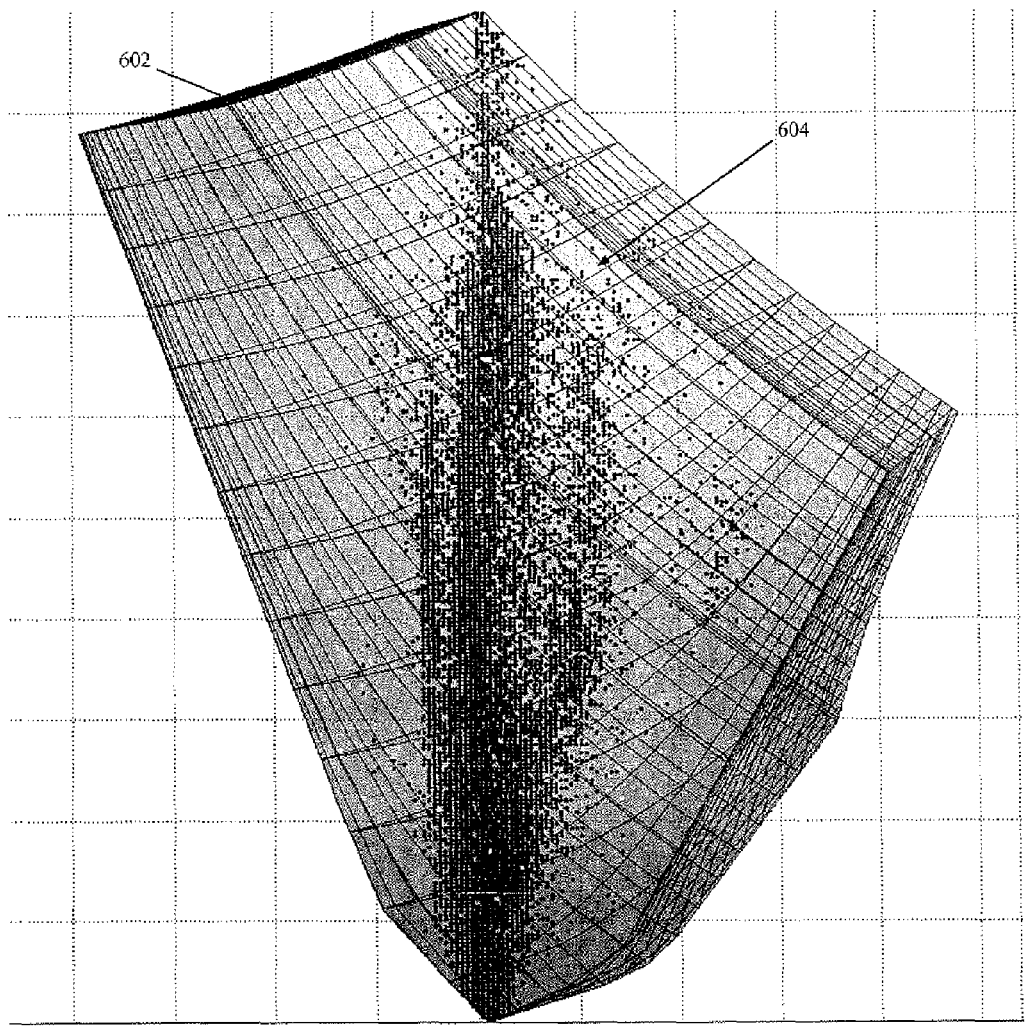
FIG. 6 is a diagram illustrating an example of the colors of an image spanning only a portion of a device gamut.

FIG. 6 is a diagram illustrating an example of the colors of an image spanning only a portion of a device gamut. When compression for gamut mapping is unnecessary, it can typically be assumed that images have a color range which is smaller than the color range of the encoding color space. In other words, every device color space covers a certain range of colors. However, colors presented on an image do not necessarily span the entire color range available for a device. This is seen to correspond with underutilization of the encoding color space As can be seen in FIG. 6, an image may use only part of all available device colors. In this example, an image 604 encoded in the sRGB color space occupies approximately one-third of the sRGB gamut volume 602. More specifically, FIG. 6 depicts a projection of sRGB gamut on $L^*$-a plane in CIELab color space, where the black dots represent the positions of pixels of image 604. Image 604 may have only a small number of saturated color values. Thus, the image may span only part of available color space 602.

As such, device-to-device gamut mapping algorithms which use compression typically take into consideration the gamut size of the device color space. However, such algorithms typically disregard the fact that actual colors of the image may span only a smaller part of all available colors. This may result in performing color compression even in cases when the destination device is capable of reproducing all of the colors of the image. Such compression is seen to be unnecessary, and typically results in suboptimal color reproduction.

Figure 7:
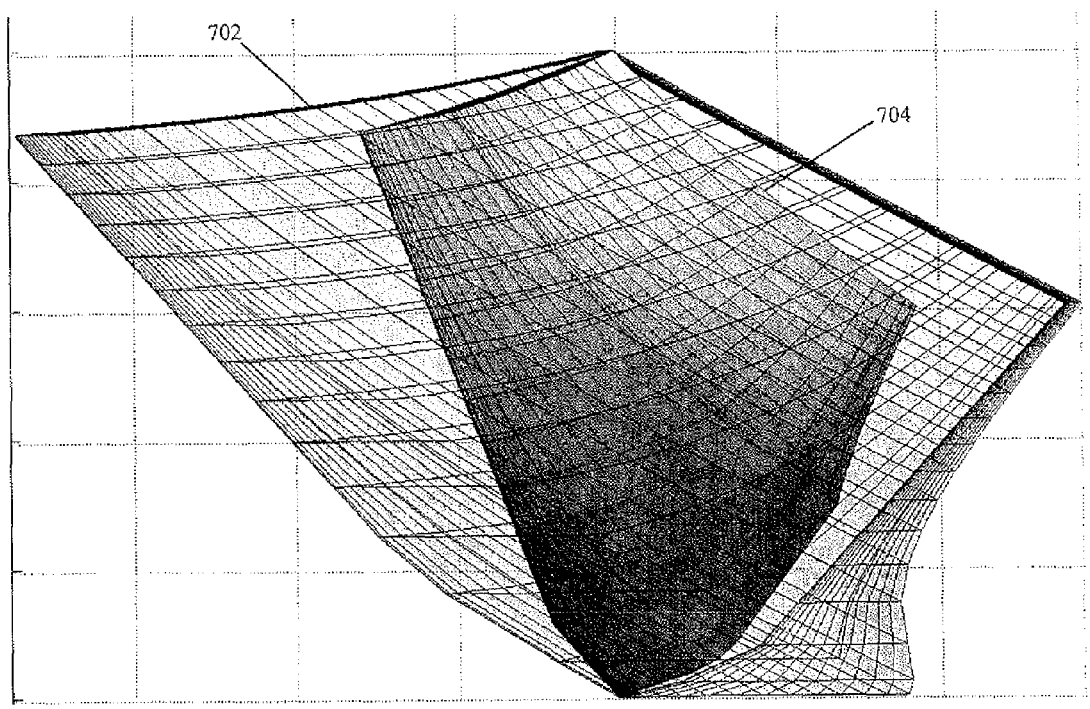
FIG. 7 is a diagram illustrating an example of the confinement which can occur when an image encoded in one color space is re-encoded into a larger color space.

FIG. 7 is a diagram illustrating an example of the confinement which can occur when an image encoded in one color space is re-encoded into a larger color space. As noted above, underutilization of a color space may also be realized when an image is re-encoded, where an image originally encoded in one color space is re-encoded into another color space which is larger than the original color space. When re-encoding the image into the larger color space, the gamut of the original image, which is determined from the encoding profile, is typically lost and the gamut of the encoding space is typically all that is available. Consequently, subsequent gamut mapping will typically produce suboptimal color reproduction.

For example, an image encoded in the sRGB color space may be re-encoded (e.g., converted) in a wider color space such as ProPhoto. The range of color present in an sRGB image is confined to the sRGB gamut, and re-encoding of that image into the ProPhoto color space does not change the colors of the image. Thus, when the sRGB image is re-encoded into ProPhoto color space, the image is still confined to the sRGB gamut, which is typically much smaller than the ProPhoto gamut. FIG. 7 illustrates such an example, with the projection of a ProPhoto gamut 702 and an sRGB gamut 704 on an $L^*$-a plane of CIELab space. As can be seen in FIG. 7, ProPhoto gamut 702 is significantly larger than, and encloses, sRGB gamut 704.

As a result, if an sRGB image is encoded into the ProPhoto color space and then subjected to a perceptual gamut mapping operation, the gamut mapping will typically be based on the larger ProPhoto gamut. Consequently, the gamut mapping will likely produce suboptimal color reproduction. In other words, as the image is sent to the color management pipeline, the image is treated based on the encoding color space (e.g., ProPhoto) even though the range of colors of the original source image may be significantly smaller than the encoding space.

For ICC/WCS color management, an image is typically treated according to a device-to-device paradigm, and the encoding space is therefore considered to be the original image space. This typically results in suboptimal gamut mapping, since the gamut mapping is typically performed under the false assumption that the image has a range of colors which matches that of the encoding color space.

In a further aspect (not shown), color reproduction may be suboptimal in an inverse situation in which a larger color gamut image is encoded into a smaller color space. In such a situation, the information on the original color range can be lost, even if the original image was compressed into the gamut of the encoding space. The color management pipeline will typically not have information on the original image color gamut. Even if the color gamut of an output device is significantly larger than the encoding space, the color management pipeline typically cannot accurately expand the color of compressed image. This typically results in saturation and contrast loss.

In yet a further aspect, the reproduction of the same image may change drastically depending on the encoding space. In such situations, a content provider typically has no means to control the reproduction of that image.

Figure 8:
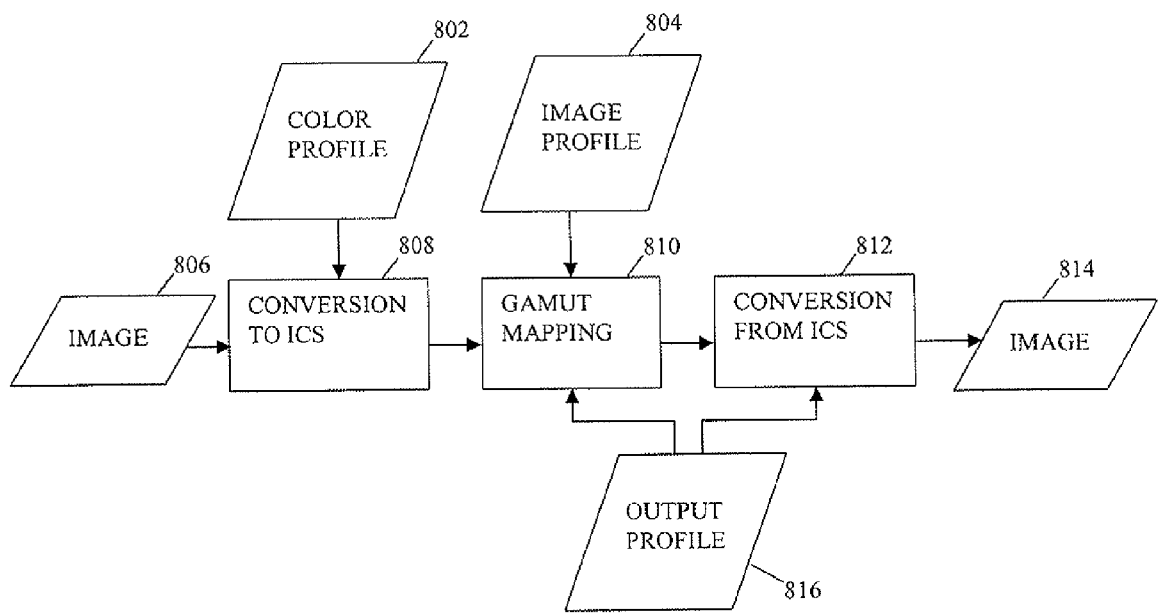
FIG. 8 is a block diagram illustrating an example of using a color profile and an image profile within a color management pipeline, to convert digital values corresponding to colors of an image from a source color space to a destination color space.

FIG. 8 is a block diagram illustrating an example of using a color profile and an image profile within a color management pipeline, to convert digital values corresponding to colors of an image from a source color space to a destination color space. According to example embodiments, profiles (e.g., ICC or WCS profiles) can be used to communicate information about image/source device spaces and image color gamut. More specifically, a color profile 802 and an image profile 804 can be used for conversion to independent color space and for gamut mapping, respectively.

Conventional systems use a single profile to perform the two above-mentioned tasks. More specifically, in conventional systems, a single profile is typically used for color translation between values corresponding to an image and device independent color space, and for determination of a color range of a device or device color gamut. However, according to example embodiments described herein, color profile 802 and image profile 804 can be used to perform these tasks, respectively.

In this regard, image profile 804 can be used in two ways. First, image profile 804 can be used to describe a color gamut of an image or a color gamut of the original color space of the image. In other words, image profile 804 can be used as a gamut descriptor. Thus, the workflow uses image profile 804 to build a gamut boundary and consequently uses the built gamut boundary to create gamut mapping.

Second, image profile 804 can provide for gamut mapping relative to an image or relative to the original color space of the image. In a case where image profile 804 is an ICC profile, image profile 804 may provide gamut mapping through perceptual intent of the profile. In such a case, image data can be converted to a color space specified by image profile 804, and then perceptual transformation of image profile 804 can be used for gamut mapping and conversion to device independent color space. Such gamut mapping and conversion can occur simultaneously.

As can be seen in FIG. 8, an example of using color profile 802 and image profile 804 in a color management pipe-line is illustrated. An input image 806 is converted to device independent color space (ICS) by module 808, using color profile 802. Based on information from image profile 804 and output profile 816, the image in device independent color space is mapped to an output gamut by module 810. The gamut-mapped image is then converted from independent color space to the destination device color by module 812, using output profile 816. The output from module 812 corresponds to converted image 814.

As noted above, if image profile 804 is an ICC profile, the perceptual intent of image profile 804 can be used to gamut map colors within gamut mapping module 810. Furthermore, if the workflow is used for encoding an image into yet another color space, image profile 804 can be attached to the encoded image as an image profile without modification.

Several combinations of color profile 802 and image profile 804 can be used. For example, with ICC and WCS, the following combinations can be used: ICC color profile and ICC image profile, ICC color profile and WCS image profile, WCS color profile and WCS image profile, and WCS color profile and WCC image profile.

It should be noted that image profile 804 can be embedded into color profile 802. Among other things, such embedding can allow for backward compatibility with existing workflows, as well as compatibility with image formats that typically allow for attachment of only one profile. This can allow for an increase of consistency and accuracy of color reproduction, without necessarily having to change the architecture of existing standards and workflows.

For example, if color profile 802 is an ICC color profile, image profile 804 can be stored under a separate tag in binary (or other) form that can be compressed for storage efficiency. If color profile 802 is a WCS color profile, image profile 804 can be stored under separate tag in XML (or other) form that can be compressed for storage efficiency. In addition, a color profile with an embedded image profile can be attached to an image in the form specified by an appropriate image format (e.g., tiff, jpeg). Alternatively, such a color and image profile can be communicated by other means (e.g., as separate files).

In color management workflow, color profile 802 and image profile 804 can be extracted from an image file. Alternatively, the workflow can be provided color profile 802 and image profile 804 by a workflow user.

In a case where only one profile is found or provided, the profile can be used for both color conversion and gamut mapping, thus corresponding to a single profile color management path. If two profiles (e.g., color profile 802 and image profile 804) are extracted or provided, color profile 802 can be used to convert encoded values into device independent color space, and image profile 804 can be used for gamut mapping. In this regard, an ICC color profile can use colorimetric rendering intent for the conversion. A WCS color profile, on the other hand, is typically measurement based and is intended to be used with a device model to achieve accurate conversion form to a device independent color space (ICS).

Accordingly, the use of both a color profile and an image profile as described in the example embodiments above can preserve consistency of color reproduction. Also, such an architecture can reduce unnecessary gamut compression in a case where an encoded image is re-encoded in a larger color space. For example, if an original was rendered to the sRGB color space and was later encoded into ProPhoto, the gamut mapping can be based on the actual range of sRGB, rather than on the color range of the encoding color space (e.g., ProPhoto). Thus, gamut mapping can be based on the sRGB gamut and the gamut of the destination device.

Additionally, the use of both a color profile and an image profile can allow for consistent color reproduction, independent of the encoding space. For example, in conventional workflows, encoding an sRGB image into ProPhoto and AdobeRGB color spaces can result in different color reproduction. This difference results from the conventional system using the encoding space gamut for gamut mapping to the device (e.g., printer) colors. ProPhoto and AdobeRGB have different gamut sizes and shapes. Thus, gamut mapping for these two color spaces will typically be different, and color reproduction of the same encoded sRGB image will consequently be different.

Furthermore, the use of both a color profile and an image profile can provide more control on image reproduction to a content creator. For example, the content creator may choose to use an image profile which describes the color range of an image. This approach can be beneficial if the image possesses only a limited range of colors. Use of the image profile within the range of colors of the image can reduce or eliminate unnecessary gamut compression and desaturation of colors during reproduction.

Moreover, the content creator may control particular aspects of gamut mapping by varying the size and shape of the gamut described by the image profile. For example, the content creator may use an image profile for a smaller gamut.

Figure 9:
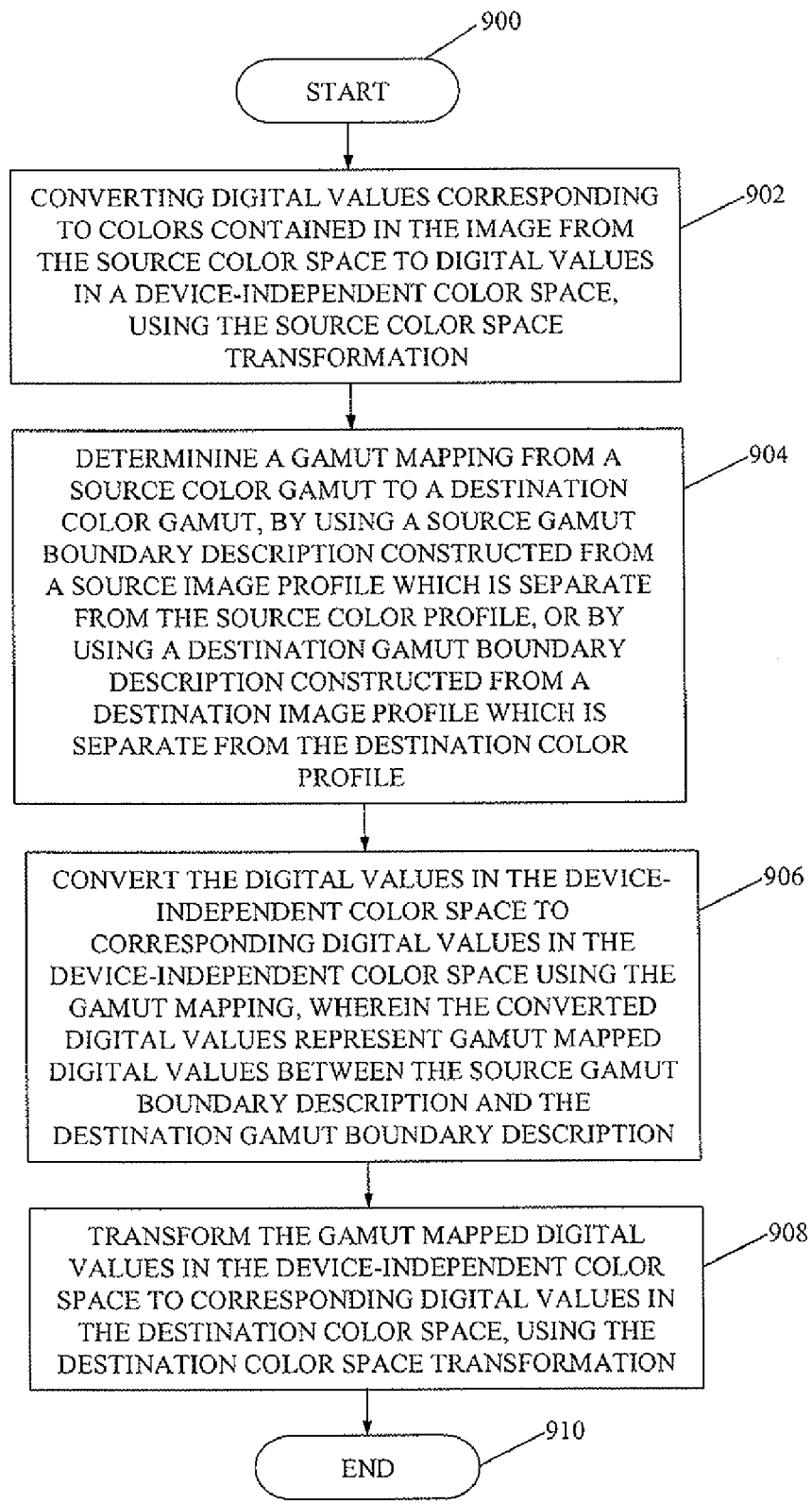
FIG. 9 is a flow diagram illustrating the conversion of digital values corresponding to colors of an image from a source color space to a destination color space according to an example embodiment.

FIG. 9 is a flow diagram illustrating the conversion of digital values corresponding to colors of an image from a source color space to a destination color space according to an example embodiment. The source color space is represented by a source color space transformation associated with a source color profile, and the destination color space is represented by a destination color space transformation associated with a destination color profile.

Following start bubble 900, digital values corresponding to colors contained in the image are converted from the source color space to digital values in a device-independent color space, using the source color space transformation (block 902). A gamut mapping is determined from a source color gamut to a destination color gamut (block 904). The gamut mapping may be determined by using a source gamut boundary description constructed from a source image profile which is separate from the source color profile, or by using a destination gamut boundary description constructed from a destination image profile which is separate from the destination color profile.

The digital values in the device-independent color space are converted to corresponding digital values in the device-independent color space using the gamut mapping, wherein the converted digital values represent gamut mapped digital values between the source gamut boundary description and the destination gamut boundary description (block 906). The gamut mapped digital values in the device-independent color space are transformed to corresponding digital values in the destination color space, using the destination color space transformation (block 908). The process then ends (end bubble 910).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for converting digital values corresponding to colors of an image from a source color space to a destination color space, the source color space being represented by a source color space transformation associated with a source color profile, and the destination color space being represented by a destination color space transformation associated with a destination color profile, the method comprising the following steps which are performed by one or more processing units executing a program stored in a memory:

converting digital values corresponding to colors contained in the image from the source color space to digital values in a device-independent color space, using the source color space transformation;

determining a gamut mapping from a source color gamut to a destination color gamut, by using a source gamut boundary description constructed from a source image profile which is separate from the source color profile, or by using a destination gamut boundary description constructed from a destination image profile which is separate from the destination color profile;

converting the digital values in the device-independent color space to corresponding digital values in the device-independent color space using the gamut mapping, wherein the converted digital values represent gamut mapped digital values between the source gamut boundary description and the destination gamut boundary description; and transforming the gamut mapped digital values in the device-independent color space to corresponding digital values in the destination color space, using the destination color space transformation.

2. A method according to claim 1, wherein at least one of the source color profile, destination color profile, source image profile and destination image profile is a device profile.

3. A method according to claim 1, wherein the source image profile provides information for a gamut boundary description which describes a gamut boundary for the image.

4. A method according to claim 1, wherein the source image profile provides information for a gamut boundary description which describes a gamut boundary for a source device from which the image was captured.

5. A method according to claim 1, wherein the destination image profile provides information for a gamut boundary description which describes a gamut boundary for a destination device to which the image will be rendered.

6. A method according to claim 1, wherein at least one of the source color profile and the destination color profile is an International Color Consortium (ICC) profile or a Windows Color System (WCS) profile.

7. A method according to claim 1, wherein at least one of the source image profile and the destination image profile is an ICC profile or a WCS profile.

8. A method according to claim 1, wherein at least one of the source image profile and the destination image profile is embedded within its corresponding source color profile or destination color profile.

9. A method according to claim 8, wherein at least one of the source image profile and the destination image profile is stored under a tag in a data form which can be compressed for storage efficiency.

10. A method according to claim 9, wherein at least one of the source image profile and the destination image profile is stored under the tag in binary form, in a case where the corresponding source color profile or destination color profile is an ICC profile.

11. A method according to claim 9, wherein at least one of the source image profile and the destination image profile is stored under the tag in XML, in a case where the corresponding source color profile or destination color profile is a WCS profile.

12. A color management module stored on a non-transitory computer-readable memory medium, wherein the color management module is configured to convert digital values corresponding to colors of an image from a source color space to a destination color space, the source color space being represented by a source color space transformation associated with a source color profile, and the destination color space being represented by a destination color space transformation associated with a destination color profile, the color management module comprising:

a first conversion module constructed to convert digital values corresponding to colors contained in the image from the source color space to digital values in a device-independent color space, using the source color space transformation;

a determination module constructed to determine a gamut mapping from a source color gamut to a destination color gamut, by using a source gamut boundary description constructed from a source image profile which is separate from the source color profile, or by using a destination gamut boundary description constructed from a destination image profile which is separate from the destination color profile;

a second conversion module constructed to convert the digital values in the device-independent color space to corresponding digital values in the device-independent color space using the gamut mapping, wherein the converted digital values represent gamut mapped digital values between the source gamut boundary description and the destination gamut boundary description; and a transformation module constructed to transform the gamut mapped digital values in the device-independent color space to corresponding digital values in the destination color space, using the destination color space transformation.

13. A color management module according to claim 12, wherein at least one of the source color profile, destination color profile, source image profile and destination image profiles is a device profile.

14. A color management module according to claim 12, wherein the source image profile provides information for a gamut boundary description which describes a gamut boundary for the image.

15. A color management module according to claim 12, wherein the source image profile provides information for a gamut boundary description which describes a gamut boundary for a source device from which the image was captured.

16. A color management module according to claim 12, wherein the destination image profile provides information for a gamut boundary description which describes a gamut boundary for a destination device to which the image will be rendered.

17. A color management module according to claim 12, wherein at least one of the source color profile and the destination color profile is an International Color Consortium (ICC) profile or a Windows Color System (WCS) profile.

18. A color management module according to claim 12, wherein at least one of the source image profile and the destination image profile is an ICC profile or a WCS profile.

19. A color management apparatus comprising:
a computer-readable memory constructed to store computer-executable process steps; and
a processor constructed to execute the computer-executable process steps stored in the memory;
wherein the process steps stored in the memory cause the processor to convert digital values corresponding to colors of an image from a source color space to a destination color space, the source color space being represented by a source color space transformation associated with a source color profile, and the destination color space being represented by a destination color space transformation associated with a destination color profile, and include computer-executable process steps to:
convert digital values corresponding to colors contained in the image from the source color space to digital values in a device-independent color space, using the source color space transformation;
determine a gamut mapping from a source color gamut to a destination color gamut, by using a source gamut boundary description constructed from a source image profile which is separate from the source color profile, or by using a destination gamut boundary description constructed from a destination image profile which is separate from the destination color profile;
convert the digital values in the device-independent color space to corresponding digital values in the device-independent color space using the gamut mapping, wherein the converted digital values represent gamut mapped digital values between the source gamut boundary description and the destination gamut boundary description; and
transform the gamut mapped digital values in the device-independent color space to corresponding digital values in the destination color space, using the destination color space transformation.

20. A non-transitory computer-readable memory medium on which is stored computer-executable process steps for causing a computer to convert digital values corresponding to colors of an image from a source color space to a destination color space, the source color space being represented by a source color space transformation associated with a source color profile, and the destination color space being represented by a destination color space transformation associated with a destination color profile, the process steps comprising:
converting digital values corresponding to colors contained in the image from the source color space to digital values in a device-independent color space, using the source color space transformation;
determining a gamut mapping from a source color gamut to a destination color gamut, by using a source gamut boundary description constructed from a source image profile which is separate from the source color profile, or by using a destination gamut boundary description constructed from a destination image profile which is separate from the destination color profile;
converting the digital values in the device-independent color space to corresponding digital values in the device-independent color space using the gamut mapping, wherein the converted digital values represent gamut mapped digital values between the source gamut boundary description and the destination gamut boundary description; and
transforming the gamut mapped digital values in the device-independent color space to corresponding digital values in the destination color space, using the destination color space transformation.

* * * * *